United States Patent
Sullivan et al.

(10) Patent No.: US 6,560,536 B1
(45) Date of Patent: May 6, 2003

(54) SYSTEM AND METHOD FOR RAPID TELEPOSITIONING

(75) Inventors: Mark C. Sullivan, Annandale, VA (US); James B. Kilfeather, Purcellville, VA (US)

(73) Assignee: Eagle-Eye, Inc., Dulles, VA (US)

( * ) Notice: Subject to any disclaimer, the term of this patent is extended or adjusted under 35 U.S.C. 154(b) by 0 days.

(21) Appl. No.: 09/829,993

(22) Filed: Apr. 11, 2001

Related U.S. Application Data

(63) Continuation-in-part of application No. 09/351,852, filed on Jul. 12, 1999, now Pat. No. 6,243,648.
(60) Provisional application No. 60/243,433, filed on Oct. 27, 2000.

(51) Int. Cl.[7] .............................. H04B 7/185; C01S 5/02
(52) U.S. Cl. ...................... 701/214; 701/213; 342/357; 342/357.01; 342/357.03; 342/357.06; 342/357.09; 342/357.12; 455/12.1; 455/422; 455/440; 375/96
(58) Field of Search ................................ 701/213, 214, 701/215, 207; 342/357, 357.09, 357.02, 357.01, 357.03, 357.05, 357.06, 357.12, 357.16, 33, 387; 379/59; 370/321; 455/440, 456, 12.1, 422; 375/96; 779/60

(56) References Cited

U.S. PATENT DOCUMENTS

| | | | |
|---|---|---|---|
| 3,063,048 A | 11/1962 | Lehan et al. | 342/357.05 |
| 3,124,799 A | 3/1964 | Hagedorn et al. | 342/358 |
| 3,172,108 A | 3/1965 | McClure | 342/451 |
| 3,191,176 A | 6/1965 | Guier | 342/357.01 |
| 3,242,494 A | 3/1966 | Gicca | 342/357.01 |
| 3,351,943 A | 11/1967 | Bush et al. | 342/352 |

(List continued on next page.)

OTHER PUBLICATIONS

Paul Sitbon, "Platform Location and Data Collection by Satellite Systems, the Eole Experiment", Laboratoire de Meterologie Dynamique, Paris, France, IEEE Transactions on Geoscience Electronics, vol. GE–13, No. 1, Jan. 1975.

"The Staryrs Early Entry Program a Demonstration Program Using the Argos System", NACLS, Aug. 1992, 19 pages.

G. Vrckornik et al., "A Novel Approach for the SARSAT System," IEEE Transactions on Aerospace and Electronic Systems, vol. 27, No. 2, Mar. 1991, pp. 290–301.

(List continued on next page.)

*Primary Examiner*—Thomas G. Black
*Assistant Examiner*—Tuan C To
(74) *Attorney, Agent, or Firm*—Shaw Pittman LLP

(57) ABSTRACT

A geographic tracking system with minimal power and size required at the mobile terminal collects observation data at the mobile terminal, forwards the data to a processor, which calculates the position. The mobile terminal needs only to gather a few milliseconds of observation data, and to relay this observation data to the processor. The range from the satellite (or other airborne transponder) to the terminal is determined using the known positions of an interrogating transmitter and a satellite, and a known terminal delay between the received signal and the transmission of the return signal, and the round trip time. An arc of locations is determined by computing an intersection of a sphere centered at the satellite having a radius given by the calculated range with a model of the Earth's surface. Alternatively, candidate locations that are consistent with the carrier signal received from GPS satellites can be used. In either case, the candidate points are considered and refined using code phase measurements from a set of GPS satellites. The candidate point having the lowest residuals or expected to measured code phases is chosen as the location of the mobile terminal. The measurements can be refined to account for various sources of error including measurement bias, relative motion and timing errors.

25 Claims, 13 Drawing Sheets

U.S. PATENT DOCUMENTS

| | | | |
|---|---|---|---|
| 3,384,891 A | 5/1968 | Anderson | 342/357.01 |
| 3,806,936 A | 4/1974 | Koster | 343/113 |
| 4,359,733 A | 11/1982 | O'Neill | 343/6.5 LC |
| 4,701,934 A | 10/1987 | Jasper | 375/1 |
| 4,751,512 A | 6/1988 | Longaker | 342/357 |
| 4,819,053 A | 4/1989 | Halavais | 342/353 |
| 4,896,287 A | 1/1990 | O'Donnell et al. | 364/754 |
| 4,975,707 A | 12/1990 | Smith | 342/357 |
| 4,998,111 A | 3/1991 | Ma et al. | 342/352 |
| 5,008,679 A | 4/1991 | Effland et al. | 342/353 |
| 5,017,926 A | 5/1991 | Ames et al. | 342/353 |
| RE33,629 E | 7/1991 | Palmer et al. | 364/748 |
| 5,103,459 A | 4/1992 | Gilhousen et al. | 375/1 |
| 5,126,748 A | 6/1992 | Ames et al. | 342/353 |
| 5,202,901 A | 4/1993 | Chennakeshu et al. | 375/84 |
| 5,303,286 A | 4/1994 | Wiedeman | 379/59 |
| 5,303,393 A | 4/1994 | Noreen et al. | 455/3.2 |
| 5,309,474 A | 5/1994 | Gilhousen et al. | 375/1 |
| 5,361,072 A | 11/1994 | Barrick et al. | 342/133 |
| 5,365,516 A | 11/1994 | Jandrell | 370/18 |
| 5,365,544 A | 11/1994 | Schilling | 375/1 |
| 5,367,306 A | 11/1994 | Hollon et al. | 342/386 |
| 5,379,047 A | 1/1995 | Yokev et al. | 342/357 |
| 5,392,287 A | 2/1995 | Tiedemann, Jr. et al. | 370/95.1 |
| 5,396,647 A | 3/1995 | Thompson et al. | 455/33.2 |
| 5,412,388 A | 5/1995 | Attwood | 342/357 |
| 5,412,389 A | 5/1995 | Olds | 342/357 |
| 5,414,432 A | 5/1995 | Penny, Jr. et al. | 342/357 |
| 5,414,728 A | 5/1995 | Zehavi | 375/200 |
| 5,459,473 A | 10/1995 | Dempster et al. | 342/357 |
| 5,469,468 A | 11/1995 | Schilling | 375/200 |
| 5,485,486 A | 1/1996 | Gilhousen et al. | 375/205 |
| 5,546,087 A | 8/1996 | Martin Neira | 342/120 |
| 5,557,637 A | 9/1996 | Glynn | 375/271 |
| 5,565,764 A | 10/1996 | Priebe et al. | 324/76.21 |
| 5,587,715 A | 12/1996 | Lewis | 342/357 |
| 5,594,754 A | 1/1997 | Dohi et al. | 375/200 |
| 5,627,546 A | 5/1997 | Crow | 342/352 |
| 5,629,707 A | 5/1997 | Heuvel et al. | 342/357 |
| 5,689,270 A | 11/1997 | Kelley et al. | 342/357 |
| 5,691,980 A | 11/1997 | Welles, II et al. | 370/316 |
| 5,752,976 A | 5/1998 | Duffin et al. | 607/32 |
| 5,841,398 A | * 11/1998 | Brock | 342/357 |
| 5,852,604 A | 12/1998 | Cooley et al. | 370/324 |
| 5,872,810 A | 2/1999 | Philips et al. | 375/222 |
| 5,955,986 A | 9/1999 | Sullivan | 342/357.05 |
| 5,963,157 A | 10/1999 | Smith | 341/131 |
| 6,038,263 A | 3/2000 | Kotzin et al. | 375/299 |
| 6,140,956 A | * 10/2000 | Hillman et al. | 342/357.07 |
| 6,177,907 B1 | 1/2001 | Golovin et al. | 342/458 |
| 6,208,290 B1 | * 3/2001 | Krasner | 342/357.05 |
| 6,243,648 B1 | 6/2001 | Kilfeather et al. | 701/213 |
| 6,249,245 B1 | * 6/2001 | Watters et al. | 342/357.03 |
| 6,295,449 B1 | * 9/2001 | Westerlage et al. | 455/422 |
| 6,313,786 B1 | * 11/2001 | Sheynblat et al. | 342/357.02 |

OTHER PUBLICATIONS

W.H. Guier et al., "A Satellite Doppler Navigation System," Proceedings of the IRE, Nov. 23, 1959, pp. 507–516.

W.H. Guier, "Satellite Navigation Using Integral Doppler Data The AN/SRN 9 Equipment", Journal of Geophysical Research, vol. 71, No. 24, Dec. 15, 1996, pp. 5903–5910.

James L. Coates, "The Nimbus F. Random Access Measurement", IEEE Transactions on Geoscience Electronics, vol. GE–13, vol. 1, Jan. 1975, pp. 18–27.

T. Green, "SA Satellite Doppler Data Processing for Platform Navigation", IEEE Transactions on Geoscience Electronics, vol. GE–13, No. 1, Jan. 1997, pp. 28–38.

Richard B. Kershner, "The Doppler Concept and the Operational Navy Navigation System," Applied Physics Laboratory, Johns Hopkins University, pp. 5–9. No date.

W. J. Geckle, et al., "Evaluation of the Ionospheric Refraction Correction Algorithm for Single–Frequency Doppler Navigation Using Tranet–II Data", Applied Physics Laboratory, Johns Hopkins University, 1982, pp. 13–21.

Randall W. Smith, "Doppler–A Plant Positioning Program Using Integrated Doppler Satellite Observations", pp. 839–856.

C. Boucher, "Methodology and Field Tests of GDOP, A Geodetic Computation Package for the Short ARC Adjustment of Satellite Doppler Observations", Institute Geographique National France, pp. 417–422.

Brown, Duane C., "Doppler Positioning bythe Short Arc Method", DBA Systems, Inc., Melbourne, Florida, p. 97–129.

Coenen, A.J.R.M. et al., "Novel Fast GPS/GLONASS Code–Aquistion Technique using Low Update Rate FFT", Electronics Letters, Apr. 23, 1992, vol. 28, No. 9, pp. 863–865.

Van Nee, D.J.R. et al., "New Fast GPS Code Aquistion Technique Using FFT", Electronics Letters, Jan. 17, 1991, vol. 27, No. 2.

* cited by examiner

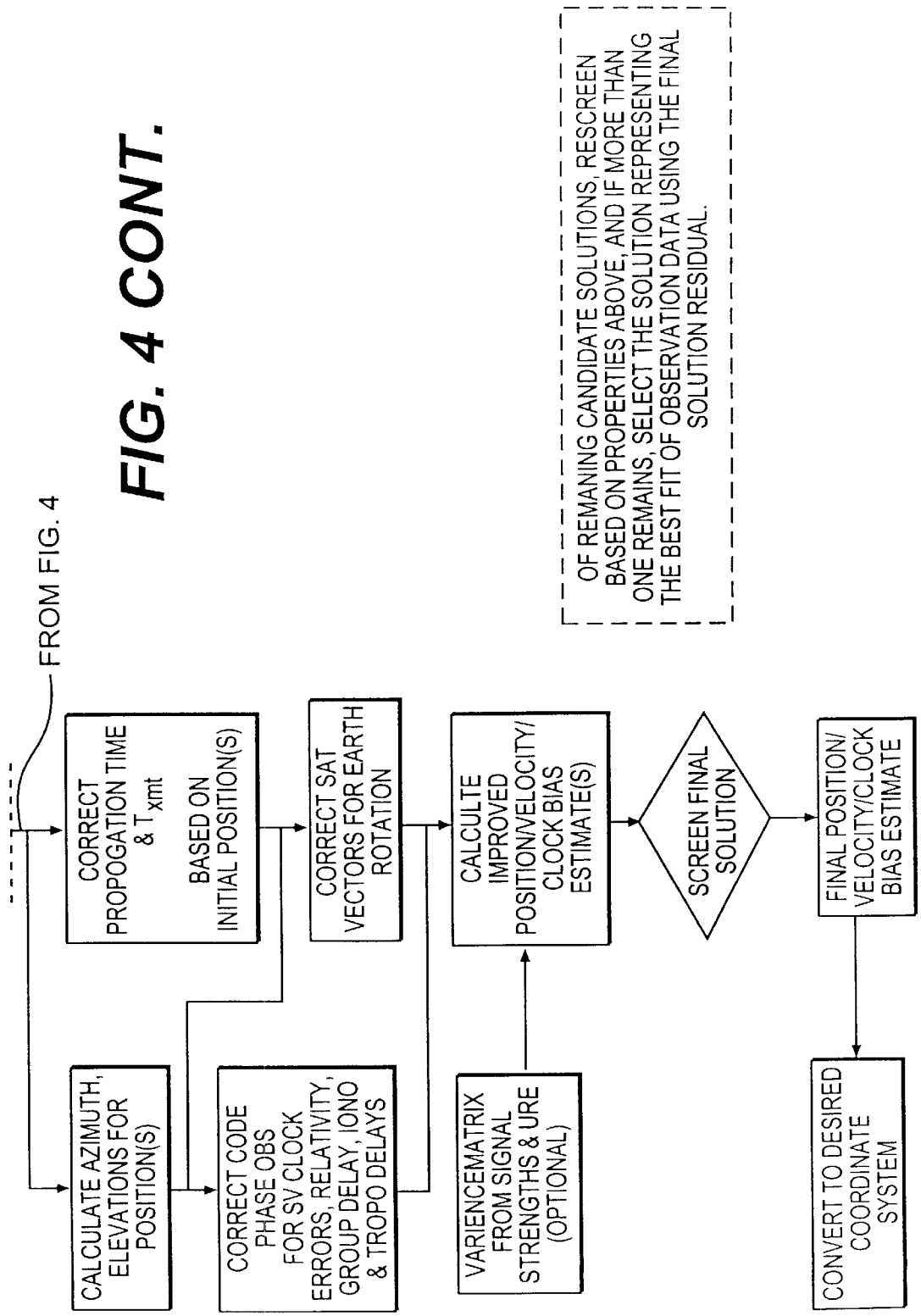

SYSTEM AND METHOD FOR RAPID TELEPOSITIONING

This application is a continuation-in-part of U.S. patent application Ser. No. 09/351,852 filed Jul. 12, 1999, which is now U.S. Pat. No. 6,243,648. Further, this application claims the benefit of U.S. Provisional Application No. 60/243,433, filed Oct. 27, 2000. Each of the preceding applications is incorporated by reference herein in its entirety.

BACKGROUND

1. Field of the Invention

The present invention relates generally to methods and systems for tracking the location of devices near the surface of the Earth, and more particularly to a method and system for tracking a device near the surface of the Earth using a very fast acquisition portable transponder.

2. Background of the Invention

Various techniques are available to determine the position of a device on the surface of the Earth. U.S. Pat. No. 3,063,048 discloses the use of the Doppler shift in a transmitted signal to determine the position of a device transmitting the signal. This patent teaches measuring when the Doppler shift frequency is changing at a maximum rate to determine the position of the object transmitting the signal undergoing the Doppler frequency shift. In this system, the satellite must continuously receive the signal being transmitted from the object to determine when the frequency is changing at its maximum to locate the object. As a result, the time to compute a position fix is unacceptably long for applications such as locating a satellite telephone.

The Global Positioning System (GPS) also provides geolocation capability. Moreover, it is desirable to know the position of a mobile terminal, such as a cellular telephone, and to have this position information at a central location (e.g., at a Service Operations Center or SOC).

One technique is to place a GPS receiver on the mobile terminal, calculate position in the GPS receiver, and transmit via satellite (or other communications system) the position fix to a central location. This method suffers from the Time-To-First-Fix (TTFF) limit inherent in GPS receivers upon waking up from a cold start. From the cold start state, a GPS receiver must download the GPS satellite almanac, ephemeris, and clock correction information. The TTFF limit effectively eliminates using a GPS receiver in situations where a long TTFF is unacceptable. For example, in wireless or cellular telephone telephony applications, it would not be acceptable to require the user to wait for the mobile terminal (i.e., the wireless or cellular telephone) to download GPS data prior to making a telephone call.

The present invention is therefore directed to the problem of developing a system and method for calculating the position of a mobile terminal, which can be accomplished rapidly using a minimal amount of power and equipment.

SUMMARY OF THE INVENTION

The present invention solves this problem by collecting observation data at the mobile terminal, forwarding the observation data to a central location, and performing the position calculations at the central location rather than at the individual mobile terminal. Thus, the mobile terminal of the present invention needs only to gather a few milliseconds of observation data, such as GPS code phase information, and then relays this observation data to a central station, via satellite or other relay means, for subsequent position calculation. In this manner, the present invention requires that the mobile unit be on only for very brief periods of time, so that a very fast (e.g. 1 second including data transmission time) position solution can be obtained. This would make practical, for example, the geolocation of a phone prior to a call being placed, which is particularly useful in satellite based phone services to control access and call routing decisions. The fast solution and minimal battery drain make practical the employment of a geolocating system in situations that may not otherwise economically justify such use.

According to one aspect of the present invention, a system for determining the location of an object located on or near the surface includes a communication satellite, a satellite gateway or earth station, a mobile terminal, and a service operations center. In this system, the communications satellite broadcasts an interrogation signal, to which the mobile terminal responds. The mobile terminal is disposed on the object, and includes a receiver, a transmitter and a processor. The receiver receives the interrogation signal from the communications satellite, and is capable of receiving signals being broadcast from GPS satellites. The processor measures at least one characteristic in each of the signals being broadcast from the GPS satellites upon receipt of the interrogation signal from the communications satellite. The mobile terminal transmits a reply signal at a predetermined time relative to receipt of the interrogation signal to the communications satellite. The reply signal includes the measured characteristic(s) in each of the signals being broadcast from the plurality of GPS satellites. The operations center receives the reply signal from the communications satellite, and calculates a position of the mobile terminal using time of arrival information and the measured characteristics returned by the mobile terminal.

In the above system, the measured characteristic(s) can include, for example, code phase information, carrier phase information, Doppler-shift information, or bit phase information. Code phase measurements alone are insufficient to unambiguously identify the position of the mobile terminal. The service operations center requires additional information to constrain the position solution. One means for constraining the position solution is to determine the range from the terminal to the communications satellite.

For this reason, in the first aspect of the present invention, the service operations center includes a processor that calculates a range between the communications satellite and the mobile terminal. In this calculation, the processor uses a time the reply signal arrived at the satellite gateway and a time difference between the broadcast of the interrogation signal to the mobile terminal and its receipt at the satellite gateway. To do so, the processor accounts for known delays in the signal path between the communications satellite and the mobile terminal and the point at which the time-of-arrival information is measured at the satellite gateway. The processor also calculates an intersection curve between a sphere, whose radius is the range previously determined, and a model of the surface of the Earth. Furthermore, the processor determines several initial points on the intersection curve, one of which points must lie within a known convergence zone around the terminal. Next, the processor calculates candidate position solutions for each initial point, and then screens the candidate solutions using predetermined criteria and discards any candidates not satisfying the screening. Finally, if more than one candidate solution remains, the processor selects the solution representing a best fit of all the observation data.

In the above system, the predetermined criteria may include one or more selected of the following: a solution range to the communications satellite, solution residuals, a solution altitude, a solution clock bias, and a solution proximity to a beam boundary.

Not all types of communications systems provide the ability to measure propagation delay from a known site such as the satellite. A second preferred embodiment of the present invention solves the problem existing in the art by sending additional signal-related information as data to the SOC along with the code phase measurements. In the second preferred embodiment of the present invention, the additional signal-related information is a signal characteristic such as observed carrier frequency or observed Doppler shift of the carrier frequency. In addition to the measurement of the signal characteristic, in the preferred embodiment of the present invention, the time that the signal characteristic is measured is sent to the SOC. Alternatively, the time that the signal characteristic is measured is estimated from the time the message containing the observed data is received by the SOC. The code phase measurements are obtained at the GPS receiver, for example, in a cellular telephone. These measurements are sent to the SOC. In addition, the carrier frequency of the GPS signal sent by each of the GPS satellites is measured and sent to the SOC. The set of carrier frequency measurements form a set of observed carrier frequencies.

Using the carrier frequencies and a general region containing the location of the receiver candidate locations are determined. The candidate locations are determined by searching in the general region for points in the general region that are consistent with the observed carrier frequencies. From this set of candidate locations, the position of the mobile terminal is determined using the code phase measurements. The position is that candidate location that minimizes a set of residuals calculated using the code phase measurements. It can be seen that the second preferred embodiment of the present invention does not require a satellite (other than the GPS satellites) for operation.

Thus, one object of the present invention is to determine a location of a mobile terminal using a SOC.

Another object of the present invention is to reduce the power requirements of a mobile terminal in order to determine its position.

Another object of the present invention is to reduce the time required for a mobile terminal to be powered on so that its position can be determined.

Another object of the present invention is to increase the speed of acquisition of information required to determine the position of a mobile terminal.

Another object of the present invention is to perform calculations required to determine the position of a mobile terminal on a device other than the mobile terminal.

Another object of the present invention is to provide a location of a mobile terminal using a SOC without having control of the communication channel over which measurement data is sent from the mobile terminal to the SOC.

Another object of the present invention is to provide a location of a mobile terminal using a SOC with little or no change to the communication channel over which measurement data is sent from the mobile terminal to the SOC.

Another object of the present invention is to provide location of a mobile terminal by performing position calculations in a SOC and not in the mobile terminal.

Another object of the present invention is to provide a ground-based (i.e., terrestrial) technique for determining position of a mobile terminal using GPS satellite measurements.

These and other objects of the present invention are described in greater detail in the detailed description of the invention, the appended drawings and the attached claims.

DETAILED DESCRIPTION OF THE INVENTION

Figure 1:
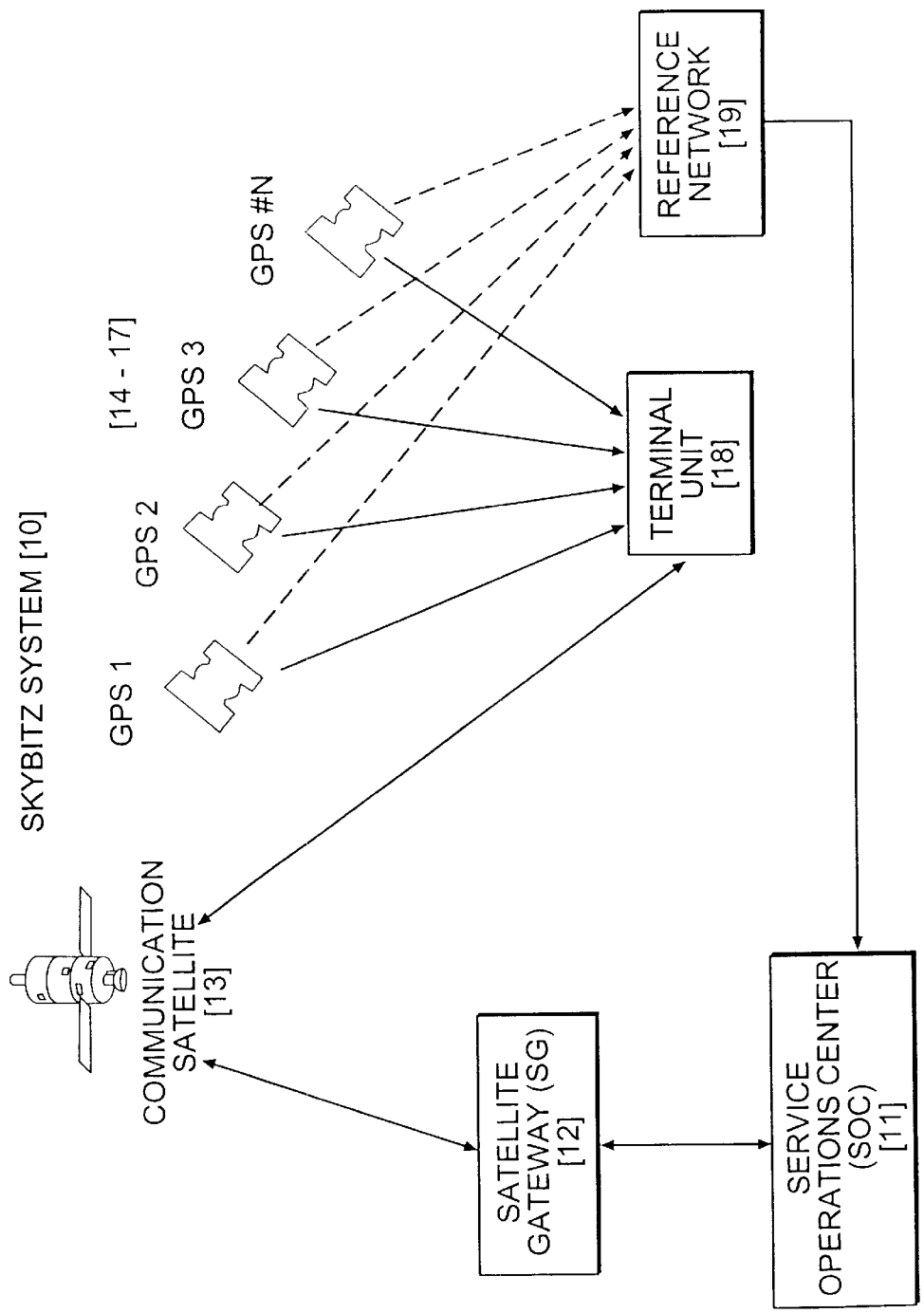
FIG. 1 depicts a block diagram of an exemplary embodiment of a system according to the present invention.

Referring to FIG. 1, an exemplary embodiment of a system [10] includes a Service Operations Center (SOC) [11], which is coupled to a Satellite Gateway (SG) [12], a communications satellite [13], satellites in the Global Positioning System (GPS) [14–17], a terminal unit [18], and a Reference Network (RN) [19]. The terminal unit [18] receives signals from multiple GPS satellites [14–17], and the communications satellite [13].

The terminal unit [18] receives a broadcast message on its forward communications satellite link, which broadcast message contains timing and acquisition aiding information. Following receipt of the message, the terminal unit performs its observation data collection function, and then transmits back to the SOC the observation data, along with any necessary system and/or status information, at a fixed delay from the received broadcast information. All processing of the observation data is done at the SOC [11]. The terminal unit [18] merely takes measurements and returns the observations as part of the broadcast/response cycle.

Service Operations Center

The SOC [11] controls the operation of the system [10] of the present invention. The SOC [11] broadcasts a signal on the forward link which contains timing and acquisition aiding information that can be received and used by the mobile terminals to synchronize time and to rapidly acquire their intended GPS signals, from which they take their observation data set. The forward broadcast can also contain command and control protocols for individual and/or groups of terminals.

The return signal from the terminal [18] includes the observation data along with any system, status or protocol information necessary to operate the system.

The return signal is synchronized to the forward signal by a specific and known delay, which allows the Satellite Gateway [12] to take an additional measurement of the round-trip signal propagation time and absolute Time-of-Arrival (TOA).

This calculated propagation time is used along with certain observation data to determine position. The SOC also collects, on a continuous basis, all ancillary information necessary to the position calculations from a Reference Network [19] and other sources. As an example, this information includes:

1. GPS broadcast ephemerides and clock correction coefficients for all satellites in view over the region of interest;
2. Current GPS Almanac;
3. Current ionospheric and tropospheric parameters;
4. Current Status messages and advisories;
5. Current communications satellite state vector and operational status; and
6. Differential correction data (if used).

Satellite Gateway

The Satellite Gateway [12] consists of satellite communications modems (channel units) and associated control and management equipment and software. The gateway maintains an accurate time and frequency reference for control of the forward link broadcast, and for propagation time measurements. The terminal needs only to accurately respond relative to the forward signal and therefore can use a much less accurate, and low power, internal reference. The satellite gateway [12] is a traditional satellite communications facility. Therefore it also includes antenna, transmitter, amplifier, up/down conversion, and other standard satellite communications equipment and software that is not shown, but is known to those of skill in this art.

Communications Satellite

The communications satellite can be any (LEO, MEO, GEO) satellite capable of transponding the forward and return signals to/from the terminal and satellite gateway. It could also be a balloon, airplane, remotely piloted vehicle or other aircraft operating within the atmosphere (Non-Bent pipe satellites can also be used if all delays in the transmission path are known and removed). The Satellite (or aircraft) position and velocity information, as well as transponder group delay and other operational parameters must be known. Examples of suitable communications satellites include:

1. Orbcomm
2. Globalstar
3. ICO
4. AceS
5. Hughes MSAT
6. Thuraya
7. Iridium

Other communications satellites are possible for use in the present invention, which satellites are known to those of skill in the art.

Terminal Unit

The present invention only requires that the mobile terminal [18] receive a signal, make observations (measuring certain aspects of the GPS signals), and return another signal, which includes the observation data, and can be accomplished over a very short interval. There are various types of observation data that can be relayed to the central site to enable the central site to determine the position of the mobile terminal.

One possibility is to collect code phase and/or carrier phase information inherent in the GPS signal. This enables the mobile unit to remain on for a very short time, thereby helping to minimize the Time-To-First-Fix. Other signal characteristics that can be measured by the terminal are Doppler-shift information, or bit phase information. Another possibility is to digitize a brief interval of the received GPS signal and transmit the digital data to the central site. The central site can then reconstruct the received signal, and determine the position based on certain characteristics in the received signal, such as Doppler shift, code phase of arrival of the received signal, bit phase information, etc.

Exemplary Embodiment of a Method of the Present Invention

The following provides an exemplary embodiment of the present invention, in which Code Phase of Arrival (COA) information is used to determine the position of the mobile terminal. Other measurements are also possible, as stated above.

Figure 2:
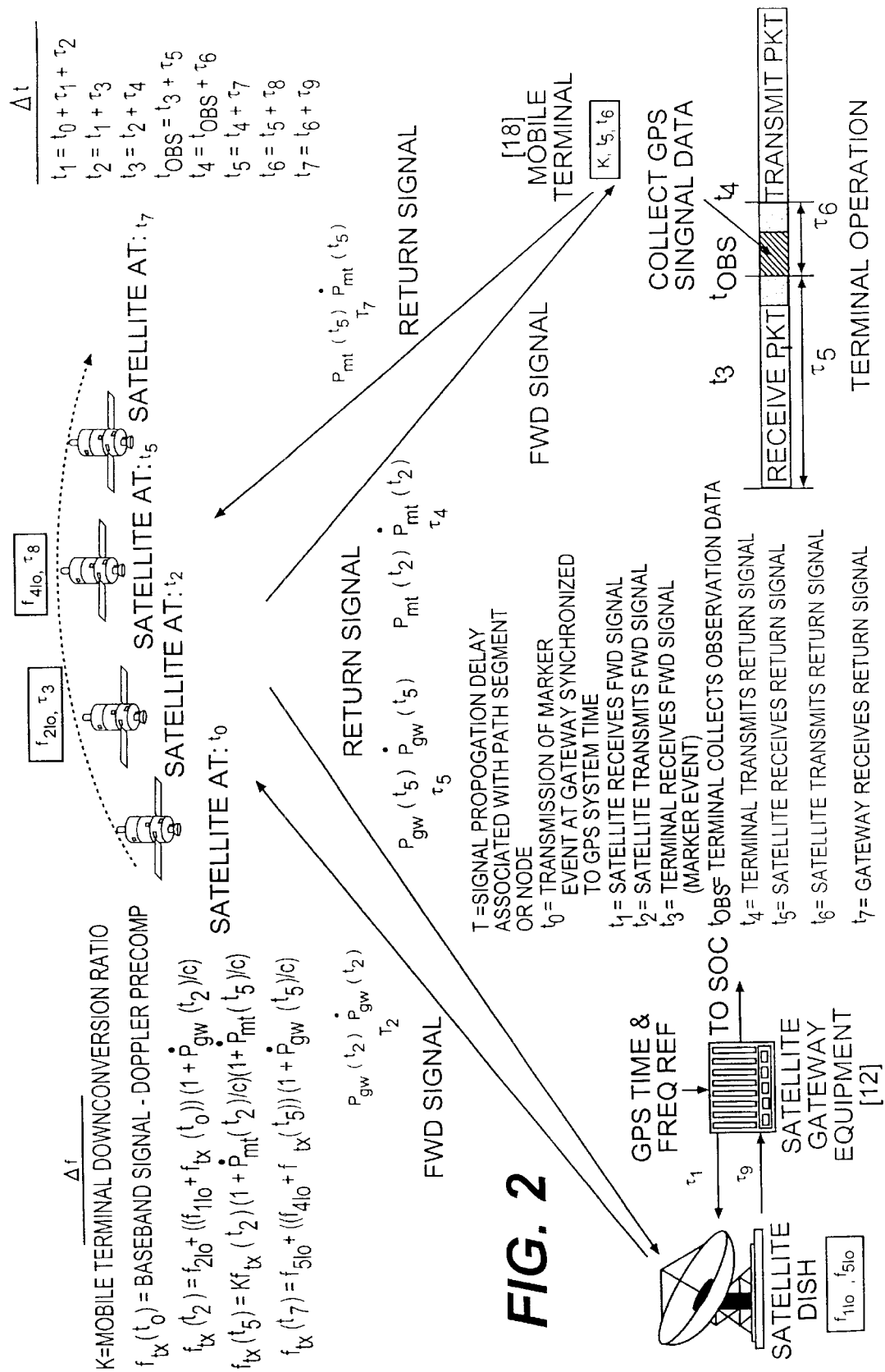
FIG. 2 depicts a diagram of an exemplary embodiment of the method according to the present invention.
Figure 3:
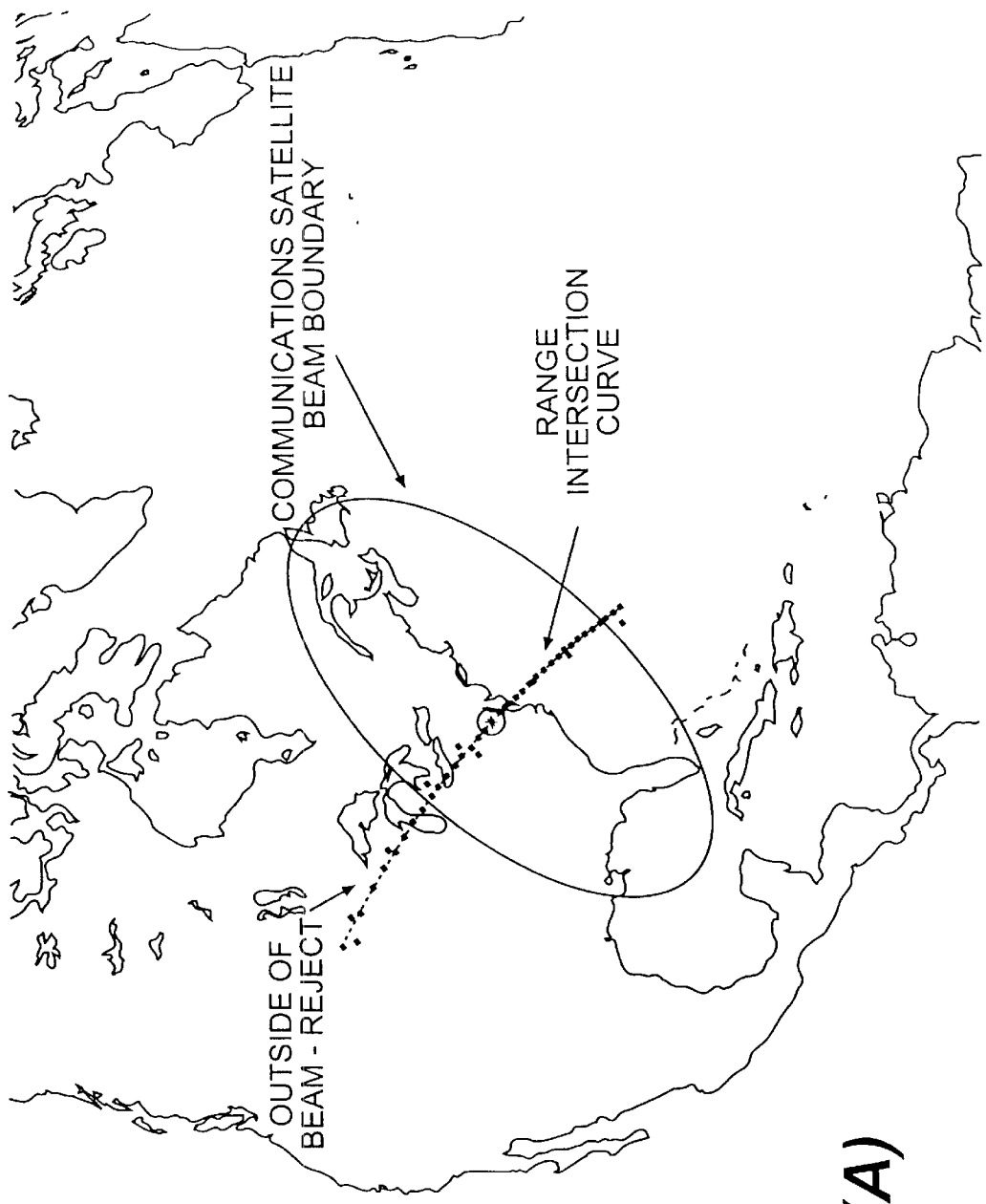
FIGS. 3(a) and 3(b) depicts a geographical representation of the method of FIG. 2 used to locate a terminal unit according to the present invention.

Referring to FIG. 2, at time $t_0$, a Satellite Gateway (SG) [12] transmits a forward signal, with a marker event, through a communications satellite [13] to a region of the Earth bounded by the satellite beam pattern as in FIG. 3. An example of a marker event is a synchronization data pattern in the packet preamble.

Depending on the communications satellite employed, multiple regions may be covered by different beams. Consequently, signals may be transmitted to these regions either in sequence or simultaneously.

The satellite [13] receives the signal at time $t_1$, and retransmits the signal back to earth at time $t_2$. Subsequently, at time $t_3$ the mobile terminal [18] receives the signal with the marker event.

When the mobile terminal [18] needs to report its position, it searches for the SG signal in the satellite downlink. This signal contains information to aid acquisition (e.g., a prioritized list of GPS satellite vehicles in view over the coverage region, Doppler offset information, timing reference, etc.). Satellite vehicles in the list are prioritized to allow the mobile terminal [18] to search for and select those satellites that provide a favorable observation set of GPS satellites (i.e., to minimize dilution of precision, exclude degraded or non-operational satellites, etc.). The SG [12] also synchronizes the outbound transmission relative to a GPS timing reference.

Using the acquisition information recovered from the forward message, the mobile terminal [18] receives a multitude of GPS signals starting at time $t_{obs}$, which is a fixed and known time interval from $t_3$. The operation of the receiver is synchronized with the signal received from the SG [12]. In turn, the signal received from the SG [12] is synchronized to GPS time (such as the X1 epoch). Consequently, the receiver clock offset associated with the GPS spreading codes used to recover the signals can be estimated back at the ground station with reasonable (less than +/−0.5 milliseconds) accuracy.

The terminal [18] measures the Code Phase of Arrival (COA) of each of the GPS signals at $t_{obs}$. The terminal [18] then relays this measurement to the SG [12] by transmitting a return signal back through the communications satellite at time $t_4$, which also has a fixed and known relationship to the inbound timing reference $t_3$.

The communications satellite [13] receives the return signal from the mobile 2 terminal at time $t_5$ and retransmits the same signal back to the SG [12] (or another ground station) at time $t_6$. The return signal is received by the SG at time $t_7$ and compared to the forward link timing reference and a round-trip propagation time measurement is taken. Absolute Time of Arrival (TOA) measurements are also taken. The SG [12] recovers the contents of the return transmission and forwards the 30 data along with its propagation time and TOA measurements to the SOC [11].

Exemplary Embodiment of Position Determination Calculations Performed at Service Operations Center The SOC [11] calculates the magnitude of the range vector between the communications satellite [13] and the terminal [18] by removing all known delays from the propagation time measurement. This is accomplished using the communications satellite position, velocity and transponder group delay information, the Satellite Gateway antenna position, known signal delays in the ground cable/equipment path, and if desired, any atmospheric or other transmission path delays that can be modeled. These delays and the relationships between the times are depicted in FIG. 2. This range calculation is fairly standard and common practice in the satellite communications field, and would be known to those of skill in the art.

After the range between the communications satellite [13] and the terminal [18] is determined, the SOC [11] determines an arc of possible locations. This is determined by computing an intersection curve 31 (see FIG. 3) of a sphere, centered at the communications satellite having a radius given by the calculated range from the satellite [13] to the terminal [18], with a model of the surface of the Earth.

The Earth can be modeled as a mathematical approximation, such as an ellipsoid, or a geoid model, or with Terrain Elevation Data. The following is one possible example of these calculations using an ellipsoid model:

The Earth can be modeled as an ellipsoid of revolution. The ellipsoid parameters depend on choice of reference frame (e.g., WGS-84). This surface can be expressed:

$$\frac{x^2}{a^2} + \frac{y^2}{a^2} + \frac{z^2}{b^2} = 1$$

Where a and b are constants representing axes of the chosen ellipsoid.

One possible parameterization of the ellipsoid surface could be:

x=a sin(φ)cos(λ)
y=a sin(φ)sin(λ)
z=b cos(φ)
φ=0 to π with 0 being the positive z-axis. And λ=0 to 2π with 0 being the positive x-axis.

The equation of a sphere at point $(X_s, Y_s, Z_s)$ with radius ρ (slant range):

$$(X-X_s)^2 + (Y-Y_s)^2 + (Z-Z_s)^2 = \rho^2$$

Substituting the Ellipsoid equation into the Sphere equation and simplifying gives:

$$(a \sin(\phi) \cos(\lambda) - X_s)^2 + (a \sin(\phi) \sin(\lambda) - Y_s)^2 + (b \cos(\phi) - Z_s)^2 = \rho^2$$

$$(b^2 - a^2) \cos(\phi)^2 - 2a \sin(\phi) \cos(\lambda) X_s - 2a \sin(\phi) \sin(\lambda) Y_s - 2b \cos(\phi) Z_s = \rho^2 - a^2 - r^2$$

Organizing the coefficients to allow a 'choose Phi—solve Lambda' Scenario:

$A = -2a \sin(\phi) X_s$ $B = -2a \sin(\phi) Y_s$ $C = (b^2 - a^2) \cos(\phi)^2 - 2b \cos(\phi) Z + r^2 + a^2 - \rho^2$ $A \cos(\lambda) + B \sin(\lambda) + C = 0$ Choosing Phi over the range of interest, calculating coefficients, and solving for Lambda gives:

$$\lambda = 2\tan^{-1}\left[\frac{(B \pm \sqrt{B^2 + A^2 - C^2})}{(A - C)}\right]$$

Figure 3B:
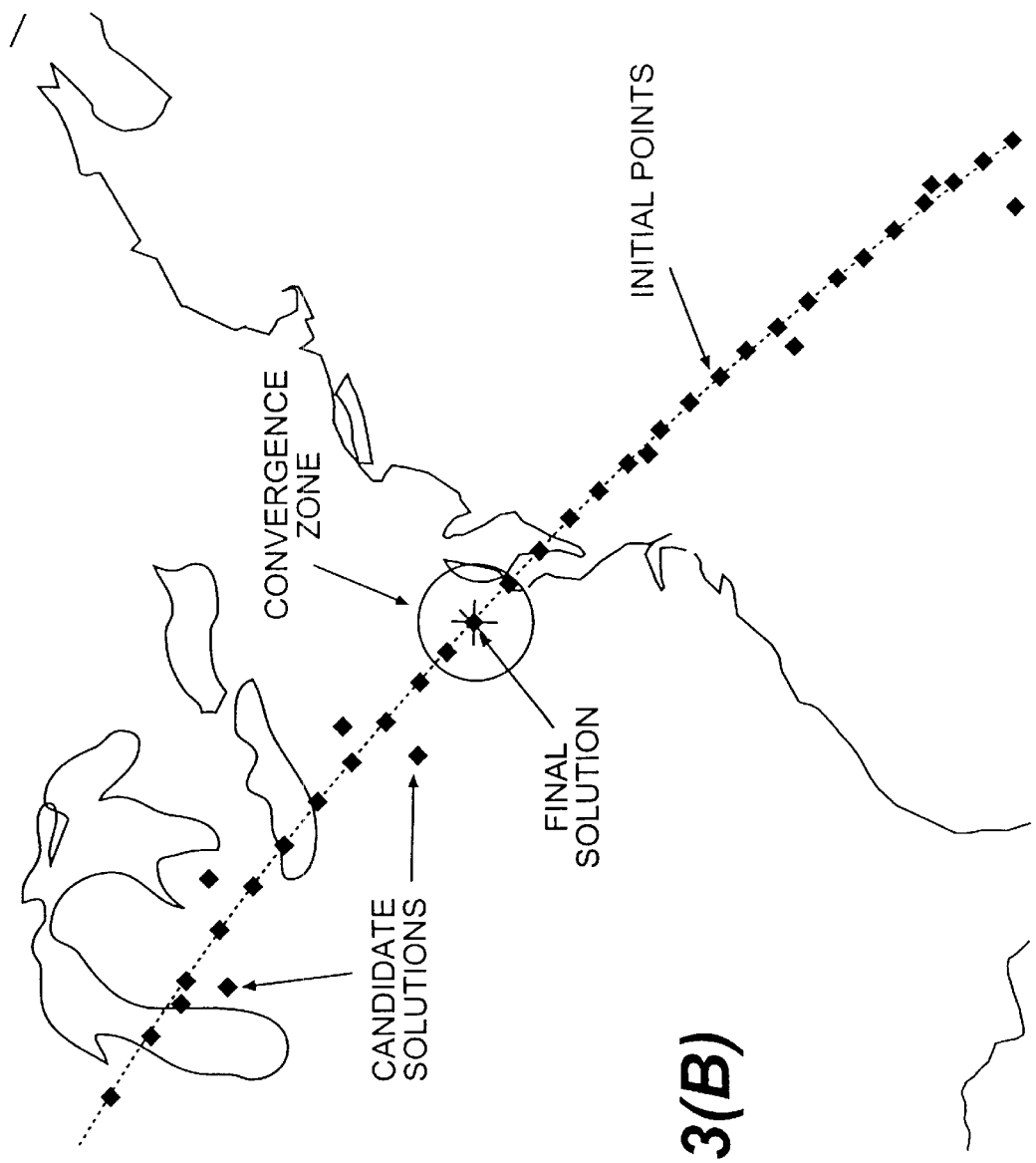

The spacing of points on the parameterized intersection curve depends on spacing of chosen points φ and the earth model chosen and is depicted in FIG. 3(b). The choice of parametrization method need only guarantee that at least one of the initial points will fall within the convergence zone around the true solution. As used herein, convergence zone refers to the area around the location of the mobile terminal in which a point must lie to guarantee that the position calculation will converge to that location. The size of the convergence zone will vary depending on number, quality and type of observation data used, but as an example, the convergence zone for the code phase observations is approximately a radius of 75–80 Km (See FIG. 3(b)).

One could also use a Geoid model or digital terrain information to construct a similar arc of points by keeping only those points with a range to the communication satellite that is within a certain tolerance.

Points could be sub-sampled or interpolated as desired due to the fact that these only represent a first approximation as input to the least squares algorithm. It is only required that at least one point on the arc lay within the guaranteed convergence zone around the true solution.

Only that portion of the arc within the region of the Earth bounded by the satellite beam pattern is retained by the SOC. Refer to FIG. 3(a), which depicts the bounding of the arc (or parameterized intersection curve) by the beam pattern.

The SOC next determines the time that the mobile terminal collected the GPS signal ($t_{obs}$). The collection time is determined from the range between the satellite and the terminal and SG. The known delays in the transmission paths (i.e., transponder group delay, atmosphere, etc.), the terminal collection method (i.e., fixed delay from $t_3$ and integration period), and the absolute TOA measurement.

The SOC then employs a satellite orbit model to estimate the positions of the GPS satellites at their time of transmission ($t_{xmt}$). GPS $t_{xmt}$ is calculated from $t_{obs}$ less the GPS signal transit time (user must also correct for earth rotation during signal transit time if working in Earth fixed coordinates).

Using each point on the arc as an initial guess, an iterative least squares technique fits the observation data to the predicted data and minimizes residual error. One example of these calculations follows:

Create system of linearized normal equations for least squares solution.

$$-\frac{X^k - X^0}{(P_i^k)^0}x_i - \frac{Y^k - Y^0}{(P_i^k)^0} - \frac{Z^k - Z^0}{(P_i^k)^0}z_i + c\Delta t_i = (P_i^k)_{obs} - (P_i^k) - \varepsilon_i^k$$

$(P_i^k)_{obs} - (P_i^k)^0 =_i$ $A\hat{x} = b - \epsilon$

We assume the code observation $P_{obs}$ is corrected for the clock offset of the satellite according to the broadcast ephemerides (and atmospheric delays if desired). The preliminary value $P_0$ is calculated from the initial coordinates of the satellite and from the arc of points generated previously. First guess at receiver clock offset can be estimated from broadcast signal timing and slant range to the terminal. Alternately, an additional observation may be taken to guarantee a unique solution if receiver clock offset cannot be estimated to within 0.5 msec.

$$\begin{bmatrix} -\frac{X^1 - X_i}{\rho_i^1} & -\frac{Y^1 - Y_i}{\rho_i^1} & -\frac{Z^1 - Z_i}{\rho_i^1} & 1 \\ -\frac{X^2 - X_i}{\rho_i^2} & -\frac{Y^2 - Y_i}{\rho_i^2} & -\frac{Z^2 - Z_i}{\rho_i^2} & 1 \\ \vdots & \vdots & \vdots & \vdots \\ -\frac{X^m - X_i}{\rho_i^m} & -\frac{Y^m - Y_i}{\rho_i^m} & -\frac{Z^m - Z_i}{\rho_i^m} & 1 \end{bmatrix} \begin{bmatrix} x_i \\ y_i \\ z_i \\ c\Delta t_i \end{bmatrix} = b - \varepsilon$$

$$\begin{bmatrix} x_i \\ y_i \\ z_i \\ c\Delta t_i \end{bmatrix} = (A^T C A)^{-1} A^T C b$$

$\hat{r} = b - A\hat{x}$

The right side of the normal equations b represents the difference between the expected and observed code phase (modulo 1 msec) and is ambiguous. The receiver clock offset is also treated as a modulo 1 msec value. The integer ambiguity is assumed by the choice of preliminary coordinates. Matrix b is kept in the +/−0.5 msec range as a difference between two modulo 1 msec values. This forces convergence to a solution within ~150 Km from the preliminary coordinates. Matrix C is the weight matrix (inverted covariance matrix) derived from signal strengths and/or GPS satellite URE (User Range Error) values and is used in a weighted least squares solution, or set to the identity matrix for a non-weighted solution. Matrix r is the residuals matrix and can be weighted and/or summed, or analyzed as a covariance matrix with minor manipulation.

After convergence, this estimated position solution is then screened against the measured range to the communications satellite (with known tolerance), satellite beam boundaries, an acceptable altitude range (with respect to the ellipsoid, geoid or elevation model used), an acceptable receiver clock offset range, and a maximum residual threshold. Those position estimates not meeting these criteria are discarded. An example for each method follows:

Range: The initial estimate(s) lie on an arc of constant range from the communication satellite. If the candidate solution lies outside the known tolerance of this range estimate then it is discarded.

Altitude: The initial estimate(s) lie on the chosen earth model surface. If the candidate solution lies above/below the maximum/minimum height possible relative to this earth model then it is discarded.

Beam: The initial estimate(s) lie within the beam coverage footprint. If the candidate solution lies outside the beam boundary it is discarded.

Clock Bias Tolerance: The calculated receiver clock bias must fall in the range of the estimated clock bias (with known tolerance) from the propagation time measurement. If the candidate solution falls outside this range it is discarded. Therefore, as the accuracy on the propagation time measurement increases, this becomes a more valuable discriminator.

Residuals: It has been observed that the residuals (goodness of fit) for the converged solutions (for an overdetermined problem) are smallest for the true position estimate. The residuals provide an effective discriminator between ambiguous position solutions when the above least squares method is used. Therefore, an empirically determined or calculated threshold can be used (alone or in conjunction with the other screening criteria) to screen false candidates.

Doppler: The observed Doppler can be compared with the expected Doppler at each of the candidate points. Candidate points falling outside a pre-determined screening criterion are discarded. One such criterion is the sum-of-the-square-of-the-differences criterion. At each candidate point, the sum of the squares of the differences of the measured and calculated Doppler is determined. This calculation is compared against a pre-determined threshold. Those candidate points for which the calculation exceeds the threshold are discarded.

The remaining position estimate(s) can then be improved by using Atmospheric (Ionospheric and/or tropospheric) corrections to the code phase observations to further improve the position accuracy of this process (if desired), and then subjected to a final screening and residual comparison, (e.g., minimum RMS) and the best point selected. Other screening criteria could be employed based on geospatial data sets, or application specific criteria (e.g., must be over land, or near a rail line, etc.).

It should be noted that if the area of interest is small enough (i.e., within the 20 guaranteed convergence zone), such as a very narrow satellite beam, an area or city covered by an aircraft platform, or a cellular tower coverage zone, then the additional range measurement and the screening process are unnecessary, and a unique solution will result from an initial estimate at the center of the area of interest.

Well known differential correction (DGPS) techniques can be applied to the final correct position to further increase its accuracy since all the same error sources in a standard GPS solution apply here as well.

Figure 4:
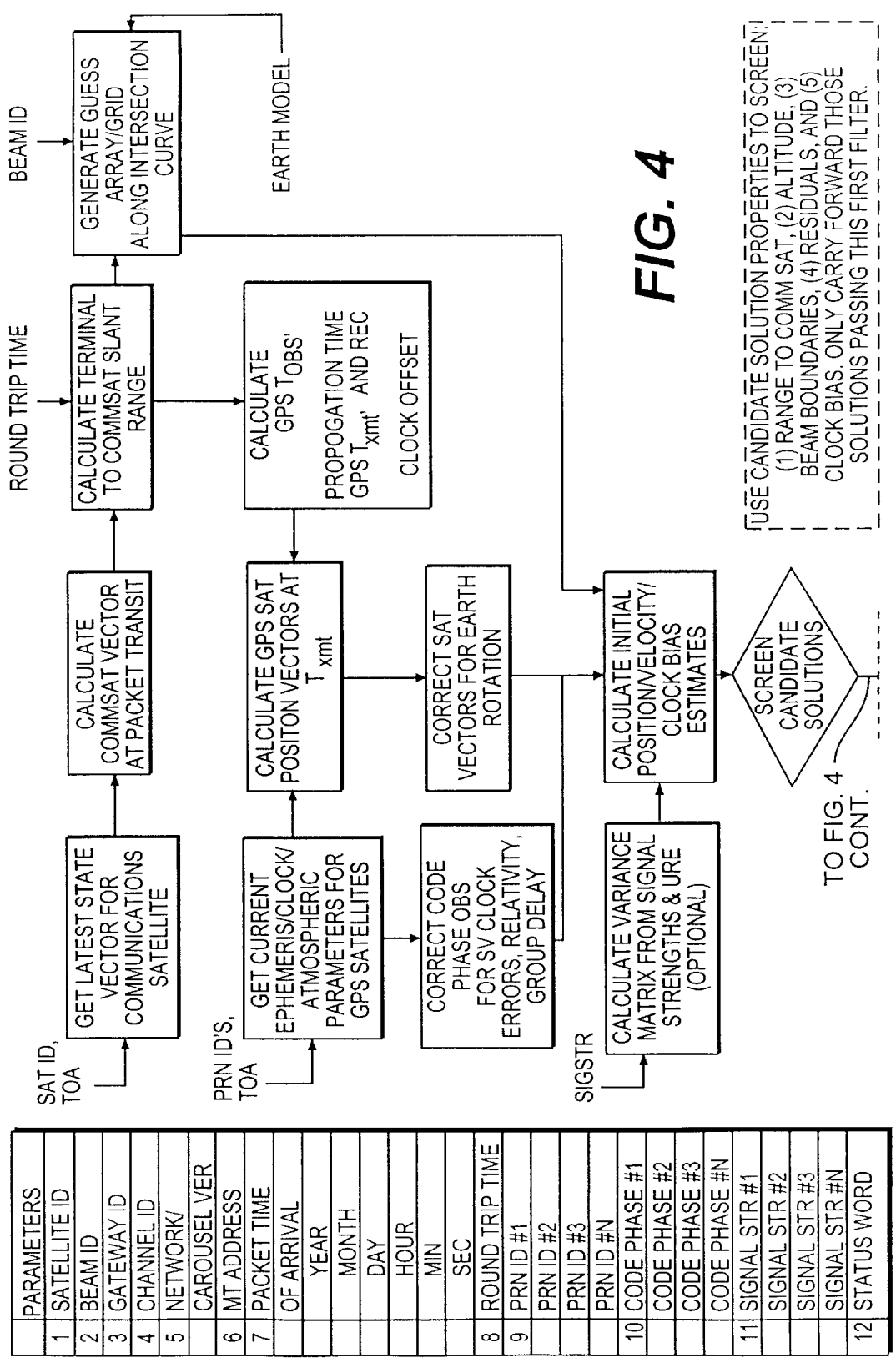
FIG. 4 depicts the various parameters returned to the Service Operations Center and used in calculating the position solution, and a flow chart of the calculations performed by the processor in the SOC.

FIG. 4 depicts the above calculations performed by a processor in the SOC [11] in flow chart form, which is suitable for implementing in software for execution on a general purpose computer. Upon receipt of the information packet at the SOC [11] containing the observation data from the terminal [18] and the measurement and ancillary data from the SG [12], the SOC processor obtains the latest state vector for the communication satellite [13], and the ephemeris, clock and atmospheric data for the GPS satellites [14–17].

The SOC [11] then performs a series of calculations as shown in the flow diagram resulting in several candidate position solutions. The candidate solutions are then screened per the criteria described previously, and another iteration is performed which can include the atmospheric correction data. If there is more than one remaining solution then a final screen and selection takes place. The final position obtained can then be converted to the desired coordinate system.

The preceding embodiment of the present invention works well for systems in which the system has control over the communication channel over which the mobile terminal communicates with the SOC. However, there are many existing communication systems in which position determinations are desirable. However, often these systems cannot be controlled in this fashion, or do not provide the required constraints for determining position. In such systems, it would be difficult to modify the existing infrastructure, by for example, imposing a pre-determined delay in the mobile terminal's response to the interrogation signal as described above. Even if delay and path could be controlled, the system may not be able to measure two-way propagation times. Moreover, accurate position estimates of the satellite or other devices in communication with the mobile terminal may not be available.

Examples of such, systems where it would be desirable to have a method for determining position using GPS signals sent to a SOC include cellular telephone networks and low earth orbit (LEO) satellite systems. In each of these environments, it would be possible to send the code phase measurements as data bits on the existing network. However, it would be difficult or impossible to control the communication channel so that the data can be used to determine position. For example, in the case of the LEO satellites, accurate position information is often not available. In cellular telephone networks, paths and pre-determined delays cannot be guaranteed without extensive modifications to the existing infra-structure. What is required, therefore, is a system and method for providing position estimates using GPS satellites in systems having pre-existing architectures that that cannot be readily or easily modified to provide position of the receiver.

A second preferred embodiment of the present invention solves the problems associated with not having control of the communication channel over which the mobile terminal and SOC are communicating by sending other signal-related information in addition to the code phase information as data to the SOC. In the second preferred embodiment of the present invention, the signal-related information is another signal characteristic such as observed carrier frequency or observed Doppler shift of the carrier frequency. In addition, in the second preferred embodiment of the present invention, the time that the other signal characteristic is measured is sent to the SOC. Alternatively, the time that the other signal characteristic is measured is estimate from the time of receipt of the mobile terminal response by the SOC.

In operation, preferably, the code phase measurements are obtained at the mobile terminal, for example, in a cellular telephone. These measurements are sent to the SOC. In addition, the carrier frequency of the GPS signal sent by each of the GPS satellites is measured and sent to the SOC. The set of carrier frequency measurements form a set of observed carrier frequencies. Measuring the carrier frequency of the received GPS signal adds very little, if any, complexity to the GPS-based position determination system of the present invention because the carrier frequency is determined by conventional systems in order to extract the code phase measurements. As described above, the present invention sends these carrier frequency measurements to the SOC rather than just discarding them as is done in conventional systems. The terms position and location are used interchangeably.

The SOC uses the observed carrier frequencies to determine candidate locations for the mobile terminal in a general region. Using the code phase measurements, the SOC refines these candidate positions and selects one as the most likely position of the mobile terminal.

Figure 5:
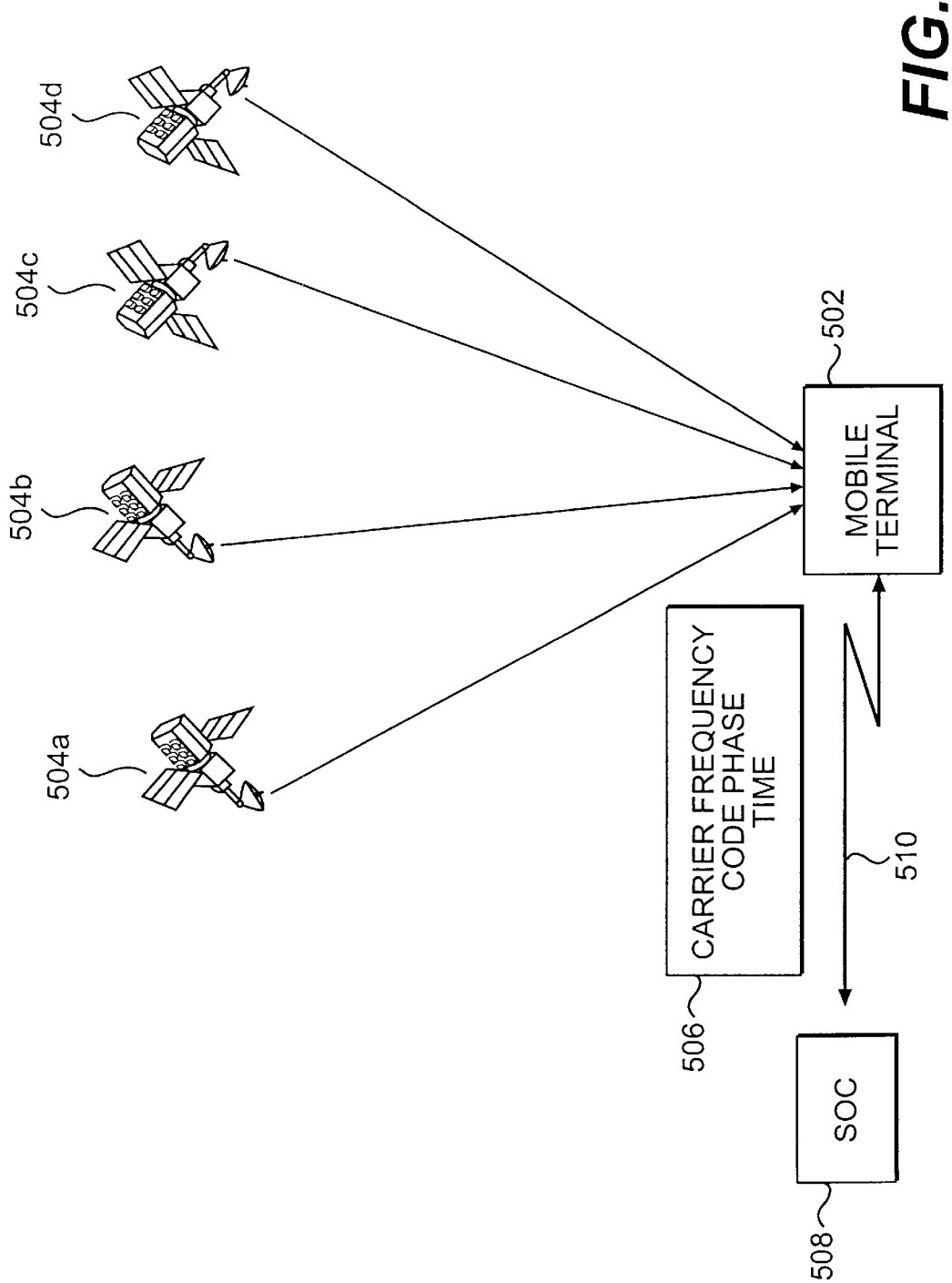
FIG. 5 is a schematic illustration of an exemplary embodiment of a system according to a second embodiment of the present invention.

FIG. 5 is a schematic diagram of an exemplary embodiment of a system according to a second embodiment of the present invention. A mobile terminal 502 collects GPS signals from a set of GPS satellites 504a–d. The set of GPS satellites 104a–d are those in view of mobile terminal 502. Mobile terminal 502 must be able to observe and collect signals from at least three GPS satellites for the present invention. Mobile terminal 502 is or contains a GPS receiver (not shown). As used herein, the term "GPS receiver" includes any radio capable of receiving the GPS signal. Such receivers are well-known to those having ordinary skill in the art, and the receiver need not be described further herein for a complete understanding of the present invention.

Mobile terminal 502 measures the carrier frequency and code phase of each of the signals received from GPS satellites. In the preferred embodiment, mobile terminal 502 also stores the time that the measurement of each carrier frequency and code phase is made.

Mobile terminal 502 can be any device that can receive GPS signals and determine carrier frequency and code phase from the received signals. For example, mobile terminal 502 can be a hand-held GPS receiver, a GPS receiver in a container, a cellular or mobile telephone adapted to collect and process GPS signals and the like.

The measured carrier frequencies are also sometimes referred to herein as observed carrier frequencies or Doppler measurements. That is, the measured carrier frequencies differ from the actual transmitted carrier frequencies by some amount. This amount, termed the Doppler shift, arises from the relative motion of the satellite transmitter and the GPS receiver.

Mobile terminal 502 creates a message 506. Message 506 contains the observed carrier frequencies, the code phase measurements and times of the measurements for each of the GPS signals received from GPS satellites 504a–d. Mobile terminal 502 sends message 506 to a service operation center (SOC) 108 over a communication link 510. In an alternate preferred embodiment of the present invention, message 506 does not contain time. In this case, SOC 508 performs the time measurement directly using a time reference such as a local GPS receiver. The SOC estimates the measurement time as the time that the SOC receives the message plus a nominal network delay.

Communication link 510 can be any communication link. For example, where mobile terminal 502 is a cellular telephone, communication link 510 is preferably a cellular telephony link. If mobile terminal 502 is a GPS receiver in a container, communication link 510 might include a satellite communication link.

Figure 6A:
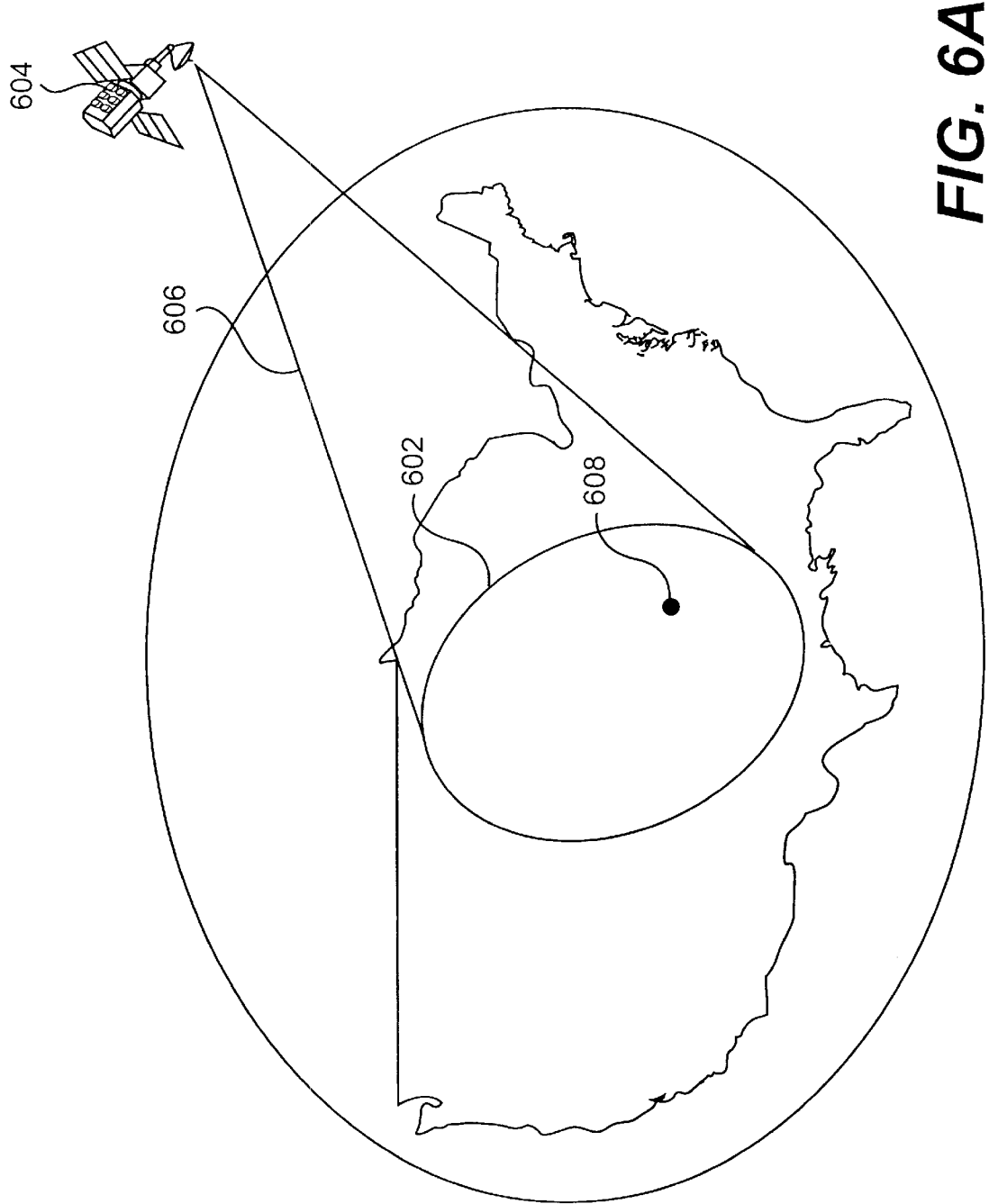
FIG. 6A is a diagram representative of a general region formed by a satellite beam footprint according to the second preferred embodiment of the present invention.
Figure 6B:
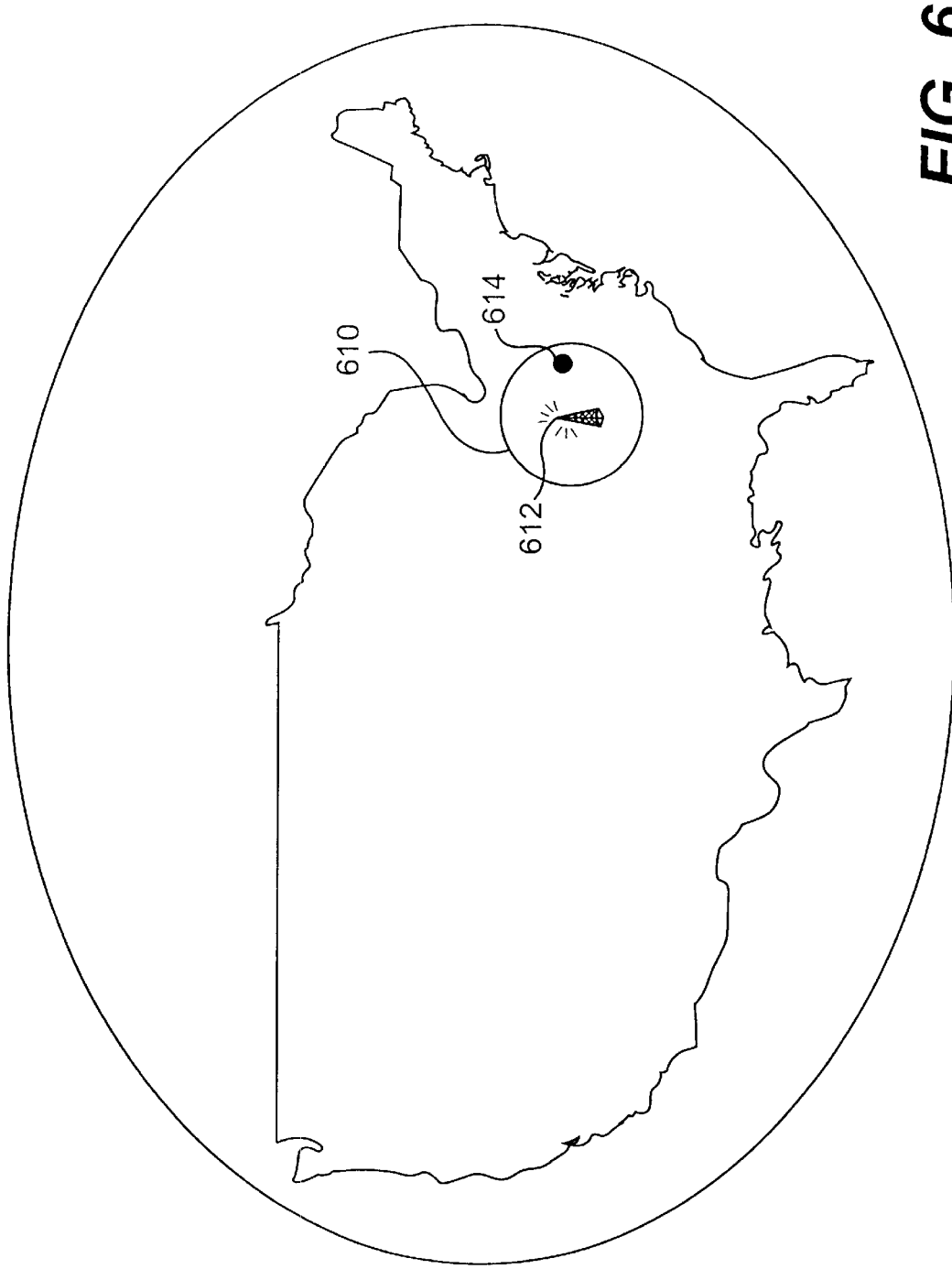
FIG. 6B is a diagram representative of a general region formed by the area in which a cellular telephone tower is located according the second preferred embodiment of the present invention.

The SOC also determines a general region where the mobile terminal is located. The general region is a broad region that can be determined in a number of ways. For example, FIG. 6A illustrates an exemplary general region 602 where mobile terminal 502 communicates with SOC 508 using a satellite 604 that uses a beam 606. Mobile terminal 502 sends message 506 to SOC 508 through satellite 604. In this case, general region 602 is a footprint of beam 606 on the earth. A location 608 of the mobile terminal is illustrated within general region 602. SOC 508 can look up the beam footprint in a table or it can be transmitted in message 606. FIG. 6B illustrates a second example where mobile terminal 502 is a cellular telephone that communicates with SOC 508 through a cellular telephone network 512. In this case, cellular network 612 forwards message 506 to SOC 508. An appropriate general region 610 is the city or state in which cellular network 612 is located. SOC 508 can look up the location of cellular network 612 in a table or it can be transmitted in message 606. In another embodiment, SOC 508 may get position information (city, state or country) in message 606. Other methods for providing a general region where the mobile terminal is located would be apparent to those skilled in the art.

As stated above, the general region can be broad. For example, the general region could be a city, state or country in which the mobile terminal is located. In fact, in some cases the general region can be as large as a hemisphere or larger. The general region must include the likely location of mobile terminal 502.

Using ephemeris data contained in the GPS received for each GPS satellite 504a–d, SOC 508 determines the position of the GPS satellite corresponding to each of the observed carrier frequencies at the time they were received by the mobile terminal. Then for any point in the general region determined above, SOC 508 can calculate the expected carrier frequencies at that point at the time the carrier frequencies were measured by the mobile terminal.

Figure 7:
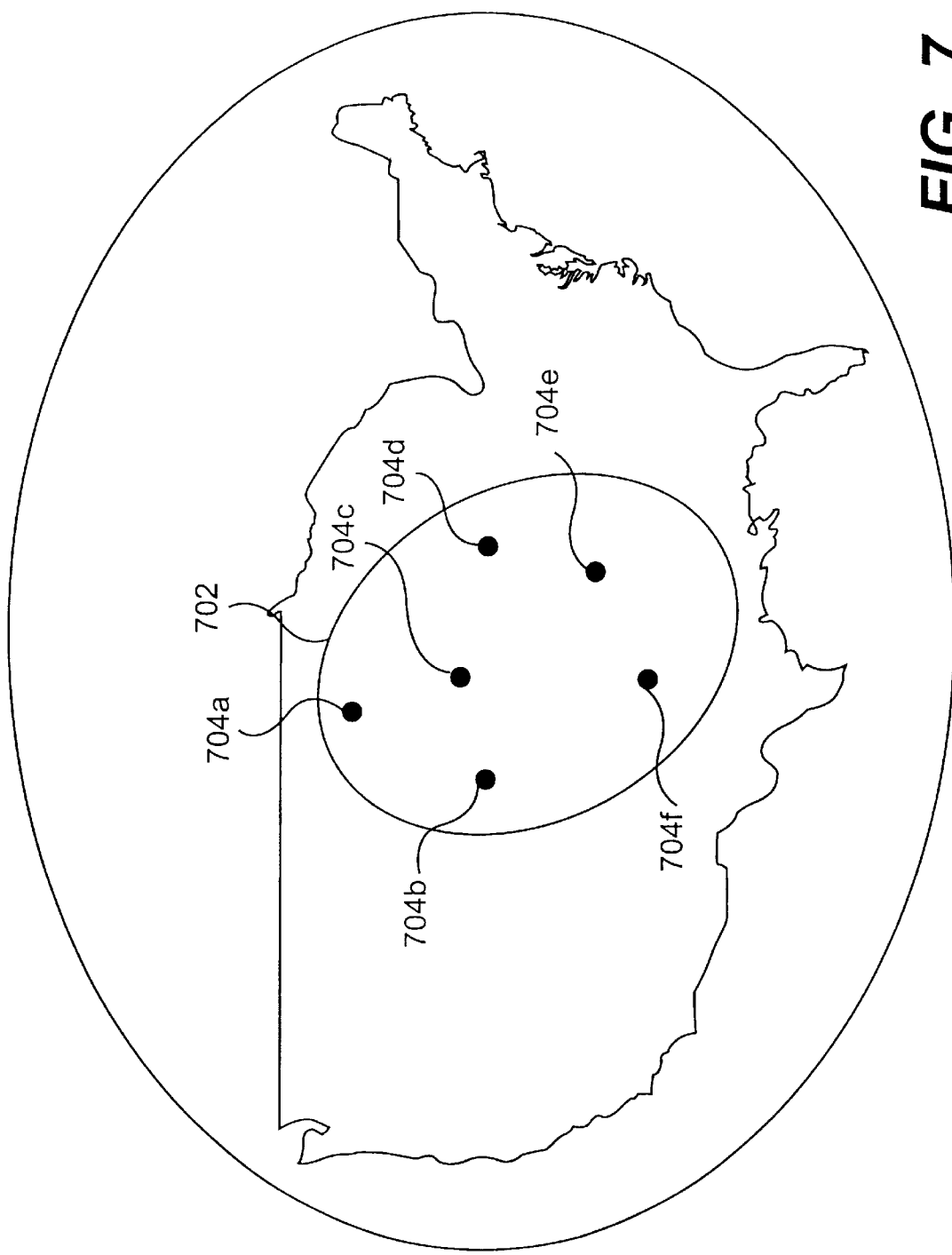
FIG. 7 is a schematic diagram illustrating candidate locations according to a preferred embodiment of the present invention.

Given the positions of GPS satellites 504a–d at the time the carrier frequencies were measured by mobile terminal 502, SOC 508 determines a set of candidate locations, within the general region that are consistent with the carrier frequencies observed by mobile terminal 502. This is done by minimizing a metric to determine local minima within the general region. The local minima are locations in the general region that minimize the metric. These locations are chosen as candidate locations. FIG. 7, for example, illustrates a general region 702. A set of locations consistent with the observed carrier frequencies within general region comprises locations 704a–f. That is, at locations 704a–f, the observed carrier frequencies agree with the expected (calculated) carrier frequencies to within some error of a metric.

In the second preferred embodiment of the present invention, the candidate positions are determined as follows. SOC 508 calculates the carrier frequency for a particular GPS satellite by computing the range rate $$\dot{p}(\vec{X}) = \frac{\vec{p}(\vec{X}) \cdot \dot{\vec{r}}}{\vec{p}(\vec{X})},$$

where $\vec{p}(\vec{X})$ is the displacement from $\overline{X}$ to the GPS satellite and $\dot{\vec{r}}$ is the satellite velocity vector.

Next a metric comparing the observed signal characteristic with the expected signal characteristic is calculated. In general, the metric is a function of the observed and expected signal characteristics. In the second preferred embodiment of the present invention, the metric provides a comparison between the observed carrier frequencies and the expected (calculated) carrier frequencies. In the preferred embodiment, the metric is determined by summing the square of the differences between the received and calculated carrier frequencies for each GPS satellite viewed by the mobile at each location. That is, the metric is calculated according to $$F(\vec{X}) = \sum_{i=1}^{N} (f_i - \tilde{f}_i)^2,$$

where N is the number of GPS satellites for which mobile terminal 502 collected data, $f_i$ is the observed carrier frequency and $\tilde{f}_i$ is the calculated carrier frequency derived directly from the range rate equation given above. This metric is then used as an input to the search algorithm that searches over the general region to determine a set of candidate locations consistent with the observed carrier frequencies.

To generate a set of candidate locations in the general region, an iterative process is preferably employed. The search algorithm is iteratively provided with different starting conditions and allowed to solve to a candidate location for each starting condition. For example, in the preferred embodiment of the present invention, the well-known Mead simplex algorithm is used to search over the general area for a candidate location corresponding to a given starting condition. The Mead simplex algorithm is described in Nelder, J. A. and Mead, R., "A Simplex Method for Function Minimization," Computer Journal 7:308–313 (1965), which is hereby incorporated by reference herein in its entirety. The start condition for the Mead simplex algorithm is a "three-location-starting triplet," representing three latitude/longitude pairs. That is three points in the general region are arbitrarily chosen in the general region and input to the Mead simplex algorithm. The Mead simplex algorithm searches for a point in the general region that minimizes the metric described above. That point becomes the first candidate location in the general region. There are likely other points in the general region that are consistent with the observed carrier frequencies. Consequently, the above process is repeated for different starting triplets to determine additional candidate locations in the general region that are consistent with the observed carrier frequencies. Any number of iterations, including just one, can be used to generate one or more candidate locations in the general region that are consistent with the observed carrier frequencies. For example, in FIG. 7, the process is repeated six times to determine the six candidate positions 704a–f.

Each candidate position is then further refined using the code phases. Preferably, the refinement is performed using the technique described above, which is hereby incorporated by reference herein in its entirety. The refinement results in a position estimate for the receiver at the time of that the carrier frequencies were measured. The final position estimate of the mobile terminal, subject to additional constraints such as altitude, is that candidate position that minimizes a set of residuals calculated using the code phase measurements as described above.

Thus, the present invention is a two-step approach to determining position when there is little or no control of the communication channel over which the code phase, i.e., accuracy measurements are transmitted to the SOC. The first step is determining a set of candidate locations in a general region in which the mobile terminal is located. Then each candidate position is further refined using the code phase measurements. A set of residuals is calculated, and the candidate location that minimizes the residuals, subject to additional constraints such as altitude, is chosen as the final position of the mobile terminal.

The position estimates of the second preferred embodiment of the present invention can be further refined by making certain tweaks to the above-described system. One of the problems with measuring the carrier frequency offsets, i.e., Doppler shift, is that the measurement is made by comparing the received carrier frequency to locally generated version of the carrier using a local oscillator. Unfortunately, local oscillators are often affected by their environments and can vary due to temperature and other environmental factors. This results in a bias to the local oscillator. That bias is the amount that the local oscillator is off from the true value. The bias is the same for all of the carrier frequencies. That is, the bias does not change with local oscillator frequency.

One way to remove the bias is using the variance of the observations. Thus, in the preferred embodiment of the present invention, the metric to be entered into the Mead Simplex search algorithm is $$F(\vec{X}) = \sum_{i=1}^{N} (f_i - \tilde{f}_i)^2 - \frac{1}{N}\left(\sum_{i=1}^{N} (f_i - \tilde{f}_i)\right)^2,$$

where N is the number of GPS satellites for which mobile terminal 502 collected data, $f_i$ is the observed carrier frequency and $\tilde{f}_i$ is the calculated carrier frequency derived directly from the range rate equation given above. Using the variance in this case effectively removes any constant bias that is introduced in the observed carrier frequency estimate due to constant errors in the local oscillator.

Another source of error that can arise in the present invention is a time error. That is, the time at which the carrier frequencies were actually measured may be slightly incorrect. The effects of this time error can be mitigated or removed by using time as another parameter that is entered in the Mead simplex algorithm. Thus, in the preferred embodiment of the present invention, not only does the Mead simplex algorithm search for the best location in the initial "guess" region, but it also refines the time estimate so that the location more accurately measures the observed frequencies.

Another source of error that can be introduced is a Doppler offset due to motion of the GPS receiver. Unlike the bias described above, this error cannot be removed simply using the variance. This is because the error is not uniform across the satellites. To account for this error, an additional parameter is entered into the Mead simplex algorithm. This parameter is the velocity vector of the mobile terminal. Preferably, it is set initially to zero. This indicates that the initial assumption is that the mobile terminal is stationary.

Figure 8:
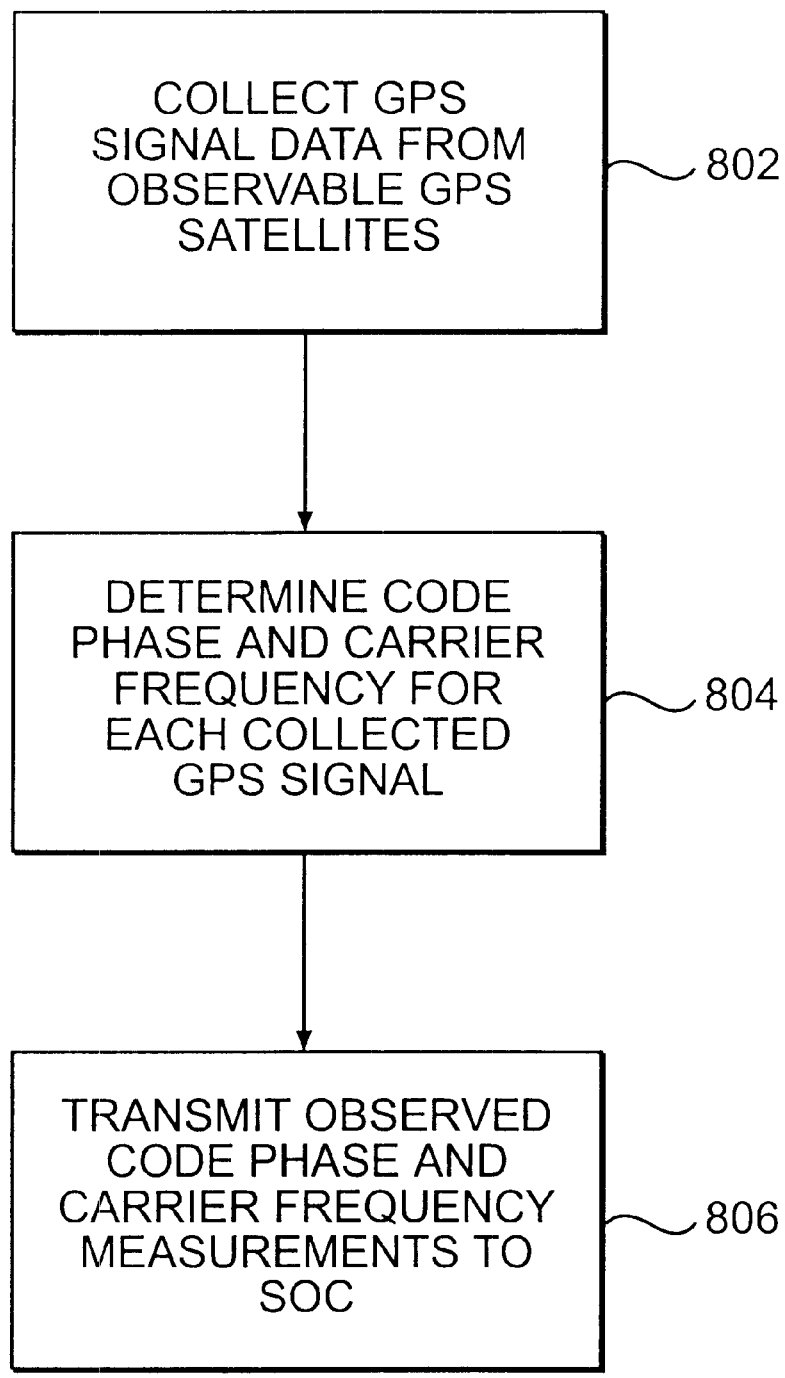
FIG. 8 is a flow chart illustrating the functions performed by the mobile terminal according to the second preferred embodiment of the present invention.
Figure 9:
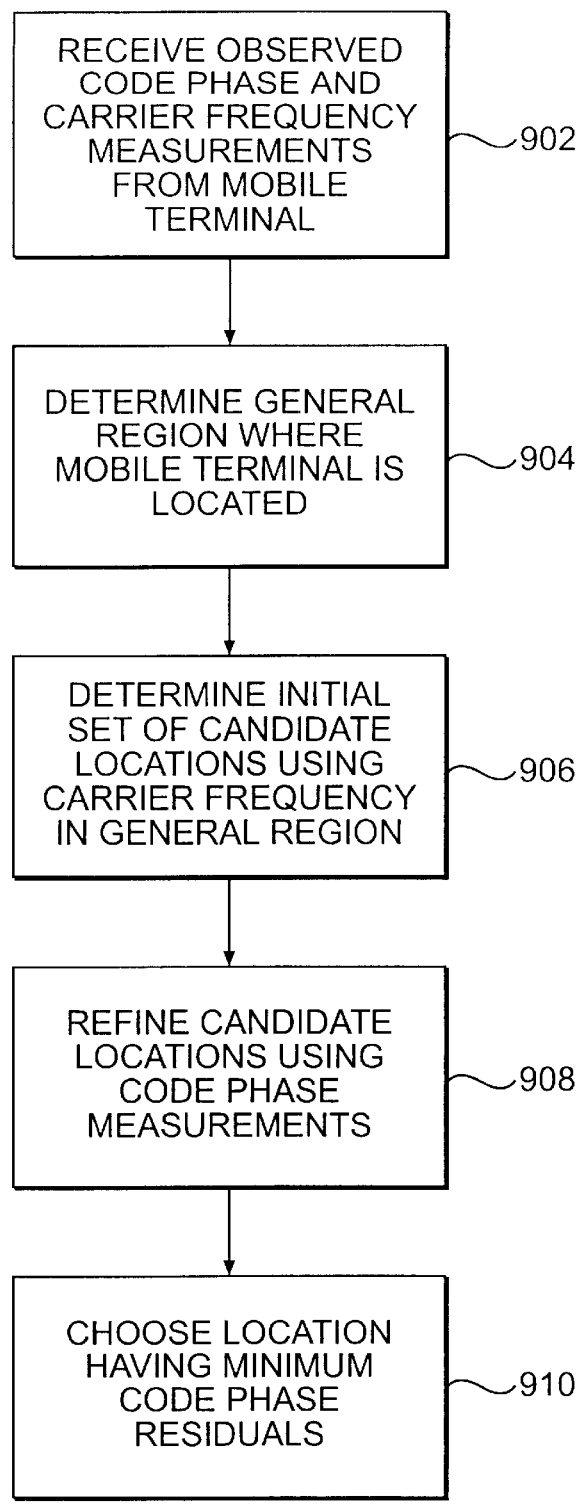
FIG. 9 is a flow chart illustrating the functions of the SOC according to the second preferred embodiment of the present invention.
Figure 10:
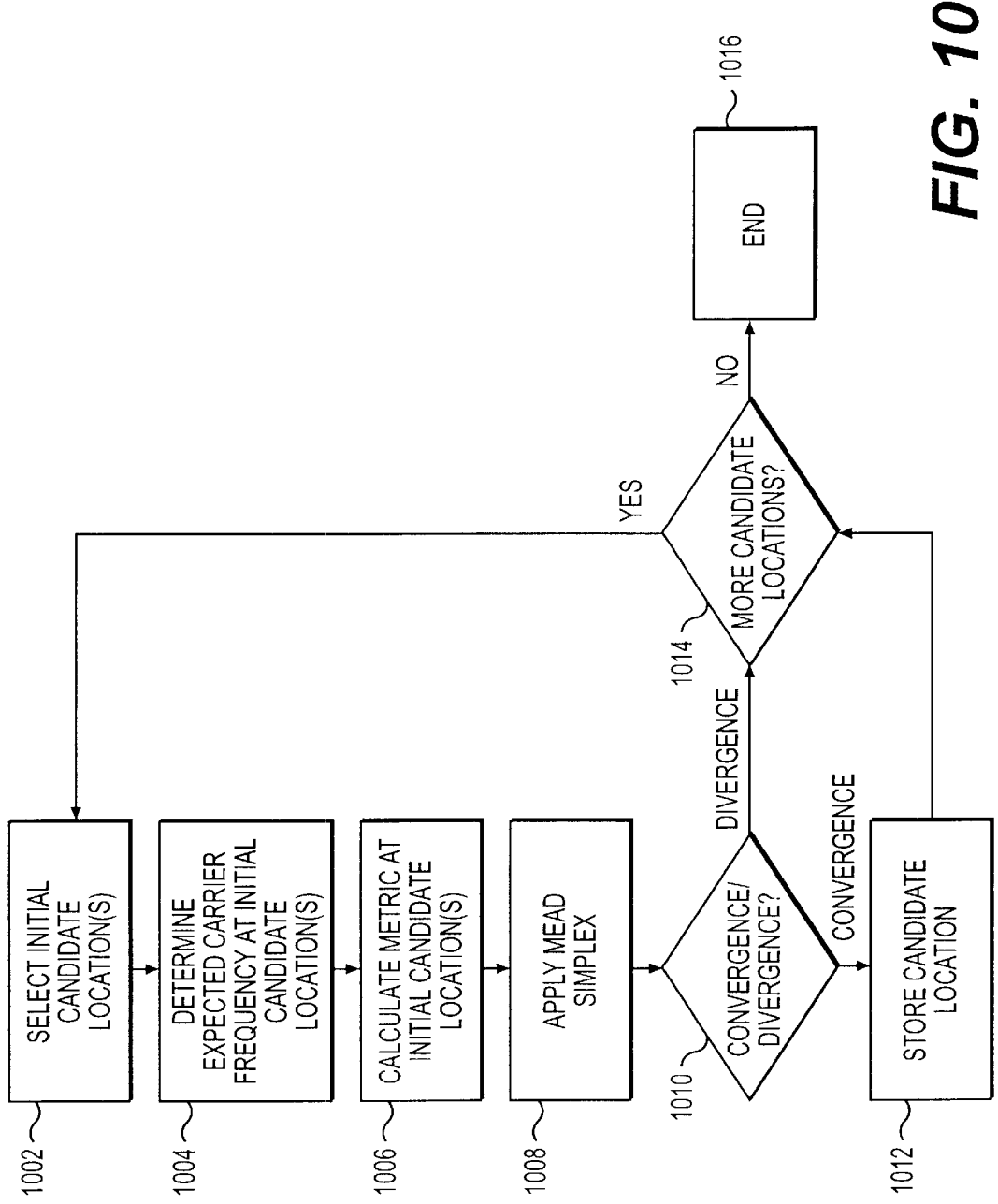
FIG. 10 is a flow chart for determining the set of candidate locations used to determine position of the mobile terminal.

A method for determining position according to the second preferred embodiment of the present invention is illustrated in FIGS. 8–10. FIG. 8 is a flow chart illustrating the functions performed by the mobile terminal according to the second preferred embodiment of the present invention. In step 802, the mobile terminal collects GPS signal data. This collection can be initiated by an interrogation signal as described above. Alternatively, the mobile can collect the GPS data periodically, for example, every hour. In addition, the mobile terminal can collect the required GPS data when it is powered on by a user, or at any arbitrary time. In step 804, the mobile terminal measures code phase and carrier frequency for each of the collected GPS signals. In step 806, the mobile terminal transmits the observed code phase and carrier frequencies to the SOC along with the time each measurement was made. Preferably, the observed code phases, carrier frequencies and times are sent in a message such as message 506

FIG. 9 is a flow chart illustrating the functions of the SOC according to the second preferred embodiment of the present invention. In step 902, the SOC receives the observed code phases, carrier frequencies and times from the mobile terminal. In step 904, the SOC determines a general region that probably contains the true location of the mobile terminal. As described above, this general region can be very broad. Using the observed carrier frequencies, the SOC determines a set of candidate positions in the general region that are consistent with the observed carrier frequencies in step 906. Preferably, this is done using the Mead simplex search algorithm. Each of the candidate positions is refined using the code phase measurements as described above in step 908. The location providing the minimum code phase residuals, subject to additional constraints such as altitude, is chosen as the final location of the mobile terminal.

FIG. 10 is a flow chart for determining the set of candidate locations used to determine position of the mobile terminal. In step 1002, an arbitrary initial candidate location is selected in the general region. In the second preferred embodiment, the arbitrary initial candidate location is really three points to provide a seed to the Mead simplex algorithm. Using satellite ephemeris data and other GPS provided data, the SOC determines the expected carrier frequency at each point in step 1004 in a well known manner. A metric is calculated at the candidate locations using the expected and observed carrier frequencies in step 1006. Preferably, the metric is the sum of the square of the differences between the expected and observed carrier frequencies at each of the locations. In step 1010, the SOC determines whether the Mead simplex algorithm converges or diverges. If the Mead simplex converges, the candidate location that the Mead simplex algorithm converges to is stored in step 1012. The SOC continues in step 1014 where it determines if there are more candidate locations to find. If so, the SOC continues in step 1002, where it selects another initial candidate location in the general region. If the Mead simplex diverges in step 1010, then the SOC continues in step 1014 where it determines if there are more candidate locations to find. If there are no more initial candidate points to find, the SOC ends its search for initial candidate locations in step 1016. As described above, the number of initial candidate locations to find is arbitrary.

In an alternative second preferred embodiment of the present invention, the GPS signals are digitized and recorded in the mobile terminal. The mobile terminal then sends the recorded digitized collected GPS signals back to the SOC rather than determine code phase and carrier frequency. In the alternative preferred second embodiment of the present invention, the SOC determines the code phase and carrier frequency for each of the collected GPS signals, and uses these code phases and carrier frequencies to determine position of the mobile terminal.

Advantageously, the second preferred embodiment of the present invention eliminates the need for the use of a satellite transponder. That is, the second preferred embodiment of the present invention can be a ground-based position (i.e., terrestrial) determination system. That is, no satellite transponder is needed for the mobile terminal to communicated with the SOC. This feature of the present invention will enable the determination of position in devices such as cellular telephones, which are small, low power devices that generally do not communicate to a central office through a satellite. Further, the present invention can be implemented with minimal or no changes to the existing infrastructures, such as cellular telephone system infrastructures.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A system for providing location information, comprising:
    a mobile terminal that receives a global positioning system (GPS) signal having a carrier frequency and code phase information from a plurality of global positioning satellites, and measures the carrier frequency and code phase for each of the GPS signals from the plurality of GPS satellites;
    a SOC to which the mobile terminal sends a message containing the received carrier frequency and code phase measurements for each of the received signals, the SOC using the signal characteristics to determine a set of coarse locations in a general region in which the mobile terminal is located, and the code phase measurements to refine the coarse locations and determine a final position of the mobile terminal.

2. The system recited in claim 1, wherein the message further comprises a time that the carrier frequency measurement for each of the received GPS signals in addition to the carrier frequency and code phase measurements.

3. The system recited in claim 1, wherein the message is transmitted over a cellular telephone network.

4. The system recited in claim 1, wherein the message is transmitted using a satellite.

5. The system recited in claim 1, wherein the SOC further comprises means for removing bias due to local oscillator inaccuracies from the carrier estimates.

6. The system recited in claim 1, wherein the SOC further comprises means for accounting for time measurement errors in the time that the carrier frequency measurements were made.

7. The system recited in claim 1, wherein the SOC further comprises means for accounting for motion of the mobile terminal relative to the GPS satellites.

8. A method for determining a location of a mobile terminal, comprising the steps of:
    (a) collecting GPS signal data from each of a plurality of GPS satellites;
    (b) transmitting a message containing the GPS signal data to a service operation center;
    (c) determining an observed carrier frequency for each of the GPS satellites from the GPS signal data collected from each of the GPS satellites and a time the mobile terminal received the GPS signal data from which each observed carrier frequency is determined;
    (d) determining a general region in which the mobile terminal is located; and
    (e) determining at least one candidate location in the general region that is consistent with the observed carrier frequencies.

9. The method recited in claim 8, wherein step (e) comprises the steps of:

(e.1) selecting an initial candidate location; and
    (e.2) searching the general region for a location consistent with the observed carrier frequencies using the initial candidate location.

10. The method recited in claim 9, further comprising the step of repeating steps (e.1) and (e.2) at least one additional time using a different initial candidate point to being each repetition.

11. The method recited in claim 9, further comprising the step of using a Mead simplex algorithm to search the general region.

12. The method recited in claim 9, further comprising the steps of:
    (f) determining a code phase for each of the GPS satellites associate with each of the at least one candidate locations; and
    (g) refining the at least one candidate locations using the code phases.

13. The method recited in claim 12, further comprising the steps of:
    (h) determining residuals for each of the candidate locations using the code phases; and
    (i) selecting the candidate location having the lowest residuals as the location of the mobile terminal.

14. A system for determining a location of a mobile terminal, comprising:
    means for collecting a GPS signal from each of a plurality of GPS satellites;
    means for measuring a first signal characteristic of each GPS signal;
    means for measuring a second signal characteristic of each GPS signal; and
    means for sending the measured first and second signal characteristics of each GPS signal to a service operation center;
    means for sending a time the first and second signal characteristics of each GPS signal are measured to the service operation center;
    means for determining one or more candidate locations using the first signal characteristic; and
    means for determining the location of the mobile terminal using the second signal characteristic and the one or more candidate locations.

15. The system recited in claim 14, wherein the means for measuring a first signal characteristic comprises means for determining carrier frequency for each GPS signal.

16. The system recited in claim 14, wherein the means for measuring a second signal characteristic comprises means for determining code phase for each GPS signal.

17. The system recited in claim 14, wherein the means for determining one or more candidate locations, comprises:
    (a) means for selecting a general region containing the location of the mobile terminal;
    (b) means for selecting a starting location in the general region;
    (c) means for determining an expected first signal characteristic for each of the GPS satellites at the starting location;
    (d) means for comparing the expected first characteristic signal with the measure first characteristic for each of the GPS signals; and
    (e) means for applying a function minimization algorithm to determine a candidate location in the general region corresponding the starting location.

18. The system recited in claim 17, further comprising:

means for selecting a second starting point in the general region; and means for applying means (a)–(c) to the second starting point to determine a second candidate location in the general region.

19. The system recited in claim 17, wherein the measured and expected first characteristics are carrier frequencies.

20. A method for determining a location of a mobile terminal, comprising the steps of:

(a) collecting a GPS signal from each of a plurality of GPS satellites;

(b) measuring a first signal characteristic of each GPS signal;

(c) measuring a second signal characteristic of each GPS signal; and (d) sending the measured first and second signal characteristics of each GPS signal to a service operation center;

(e) sending a time the first and second signal characteristics of each GPS signal are measured to the service operation center;

(f) determining one or more candidate locations using the first signal characteristic; and (g) determining the location of the mobile terminal using the second signal characteristic and the one or more candidate locations.

21. The method recited in claim 20, wherein the step of measuring a first signal characteristic comprises the step of determining carrier frequency for each GPS signal.

22. The method recited in claim 20, wherein the step of measuring a second signal characteristic comprises the step of determining code phase for each GPS signal.

23. The system recited in claim 20, wherein the step of determining one or more candidate locations, comprises the steps of:

(f.1) selecting a general region containing the location of the mobile terminal;

(f.2) selecting a starting location in the general region;

(f.3) determining an expected first signal characteristic for each of the GPS satellites at the starting location;

(f.4) means for comparing the expected first characteristic signal with the measure first characteristic for each of the GPS signals; and (f.5) means for applying a function minimization algorithm to determine a candidate location in the general region corresponding the starting location.

24. The system recited in claim 23, further comprising the steps of:

selecting a second starting point in the general region; and applying means (a)–(c) to the second starting point to determine a second candidate location in the general region.

25. The system recited in claim 23, wherein the measured and expected first characteristics are carrier frequencies.

* * * * *